Jan. 14, 1969 S. H. PITT 3,421,612

LISTER ATTACHMENT FOR HIGH SPEED WEB PRINTERS

Filed Aug. 30, 1965 Sheet 1 of 3

INVENTOR
SOLOMON H. PITT

BY [signature]

AGENT

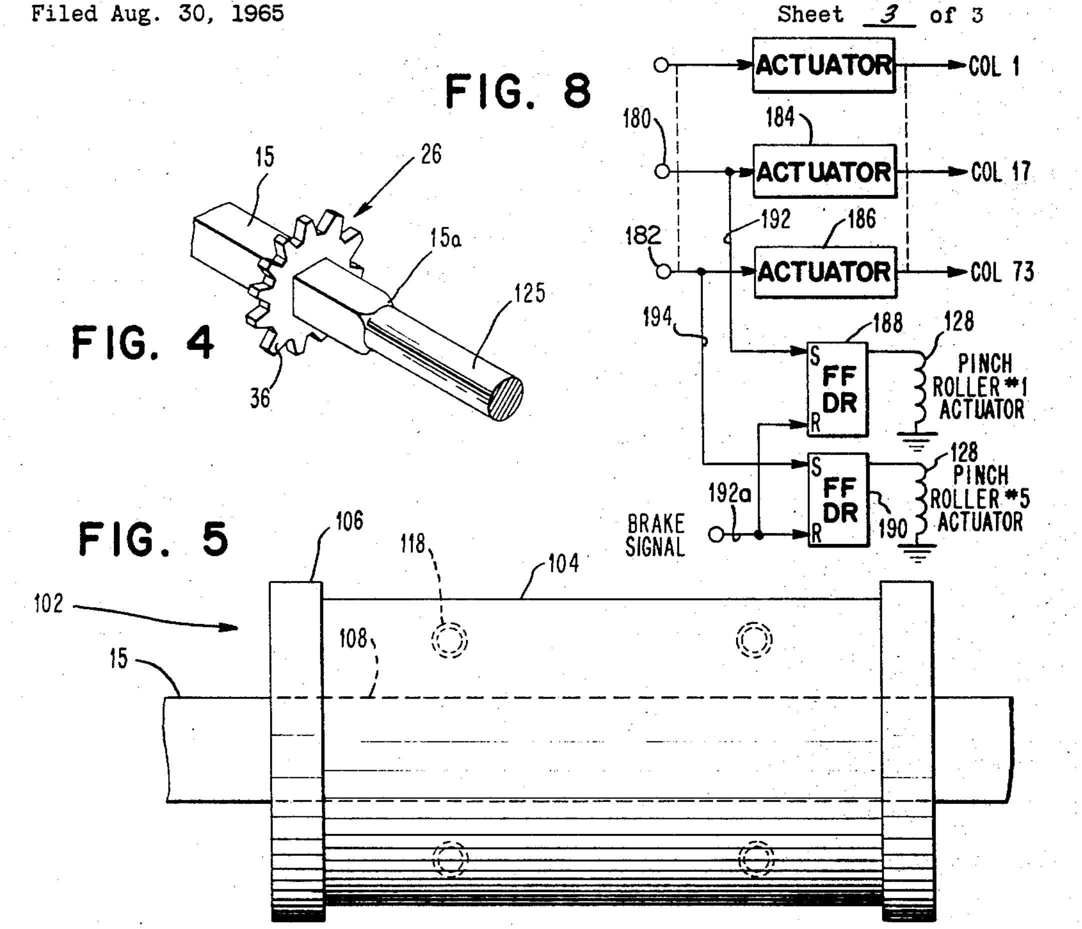
FIG. 4, FIG. 5, FIG. 8
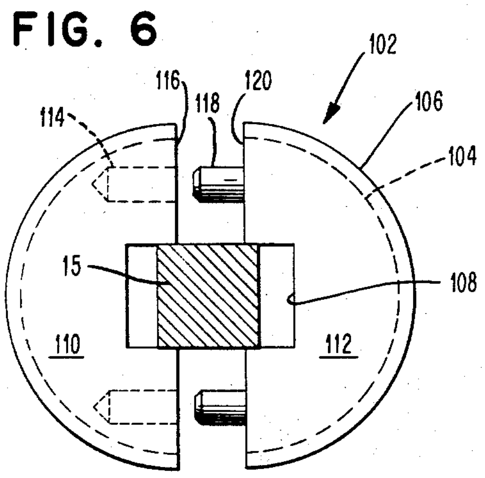
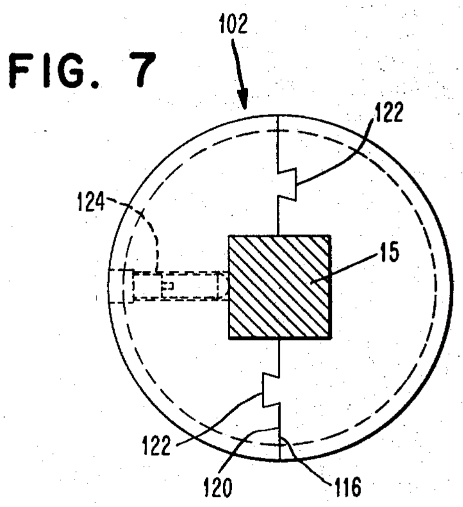

1

3,421,612
LISTER ATTACHMENT FOR HIGH SPEED WEB PRINTERS

Solomon H. Pitt, Norristown, Pa., assignor to Sperry Rand Corporation, New York, N.Y., a corporation of Delaware Filed Aug. 30, 1965, Ser. No. 483,585
U.S. Cl. 197—133 1 Claim
Int. Cl. B41j *15/04;* B41j *13/02*

ABSTRACT OF THE DISCLOSURE

This invention relates to high speed printers, and more particularly to attachments for such printers whereby, in addition to their normal function of printing on a single continuous wide web, they may also be utilized to print upon multiple continuous webs or lists, either individually or simultaneously. In practicing the invention the normal traction elements for driving a single wide web are inactivated by moving them to certain positions on their drive shaft. Then a plurality of traction spools are attached to the drive shaft, one spool for each list to be printed. Each spool is provided with a pinch roller which is selectively movable against the spools either singly or in combination, in accordance with programmed instructions from a computer with which the printer is associated, thus to advance the lists line by line, or otherwise.

This invention has to do with high speed printers, but more particularly to attachments for such printers whereby, in addition to their normal function of printing on a single continuous web, they may also be utilized to print upon multiple continuous webs or strips, either individually or simultaneously.

With still more particularity, the invention relates to printers of the type disclosed in the Hubbard et al. and Bloom et al. Patents 3,154,233 and 3,176,819, respectively, both assigned to the assignee of the present invention.

Many high speed printers capable of printing only on a single continuous strip or web are in commercial use as the output of computers or other business machines. This limited capability often makes it necessary for their users to purchase or lease other printing machines when they have need for printing lists of certain items, such as names and addresses, amount totals, etc. The present invention has as its primary object to eliminate this additional expense by providing a lister attachment for high speed printers enabling them to print multiple lists of items while retaining their original capabilities.

It is also an object of the invention to provide such an attachment which is characterized by its ease of attachment and removal, and its inexpensive construction.

In practicing the invention the normal traction elements for driving the single wide web are inactivated and a plurality of traction spools are attached to its drive shaft, one spool for each list to be printed, and each being provided with a pinch roller selectively movable against the spools either singly or in multiple, in accordance with programmed instructions from the computer or other machines with which the printer is associated, thus to advance the lists line by line, or otherwise. In the drawing:

FIGURE 1 is a front elevational view of a paper feed mechanism of a high speed printing machine as disclosed

2 in Patent No. 3,154,235 and to which the present invention is readily attached;

FIGURE 4 shows a fragmentary portion of traction drive means in accordance with a modified form of the invention;

FIGURE 5 is a front elevational view of a strip drive spool of the invention;

FIGURE 6 is an exploded end view of the drive spool showing its method of attachment to the drive shaft of the printing machine;

FIGURE 7 is an end view of a modified form of a strip driving element; and

FIGURE 8 is a logic diagram for the automatic and selective advance of the lists after printing.

Figure 1:
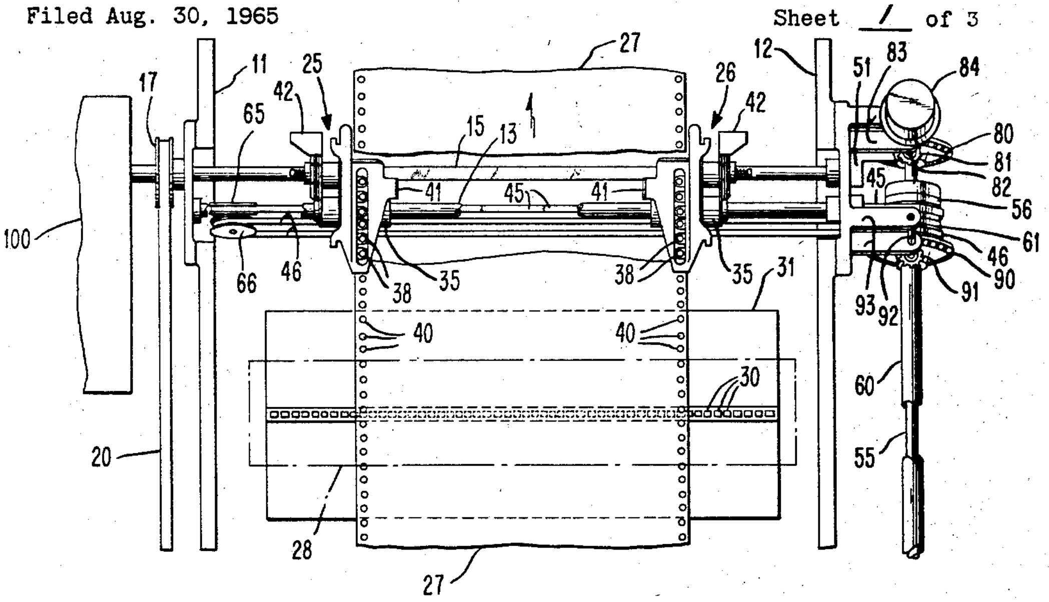

Now with reference to the details of the various figures of the drawing, it is seen that the preferred form of the invention has been illustrated as attached to a high speed printer constructed in accordance with the patents identified above, but it should be understood that this use is exemplary and that the invention is applicable to other printers of similar type or class.

Referring first to FIGURE 1, it is seen that the printer mechanism is supported between two upright side frame plates 11 and 12 of the machine. Extending between and with its ends suitably fastened to the side frame plates, is a tractor support shaft 13. Also extending between the side frame plates and suitably journalled therein is a tractor drive shaft 15 which is square in cross-section, see FIGURES 4, 6 or 7. Shaft 15 extends beyond the left frame 11 of the machine, and carries a pulley 17, around which is wound a belt 20 for driving the shaft by suitable means, not shown. However, the drive may be as disclosed in Patent 3,154,233.

The shafts 13 and 15 support a pair of paper feeding tractors 25 and 26 which are adapted to grip the opposite side edges of a continuous sheet or form 27 of paper or the like and advance it upwards in line space increments past the printing station of the machine. The printing station is considered to be that portion of the feed path lying between a type drum, shown in broken lines at 28, and a horizontally extending row of type hammers 30 supported in a print head assembly 31 and selectively actuated to impress the sheet material 27 along with an ink transfer medium, not shown, against type faces on the drum 28 to effect a line of printing on the sheet or form in each print cycle. The tractors 25 and 26 may be of any suitable construction. Both possess the same features and are of identical construction except for being designed to engage opposite edges of the form. In the form shown, and as more completely described in Patent 3,154,235, each tractor comprises a frame 35 supporting sprocket gear means 36 (FIGURE 4) keyed to the shaft 15 and driving a sprocket chain the links of which carry pins 38 adapted to engage in sprocket holes 40 formed in the marginal side edges of the form sheet 27. Each tractor is provided with a pivotal retainer 41 for holding the sheet in engagement with the sprocket pins 38 and which may be opened for removing the sheet from or inserting a new sheet in the machine. Each tractor also includes a clamping lever 42 which secures the tractor in an adjusted position and which may be operated to enable lateral adjustment of the tractors along the shafts 13 and 15.

Means are provided for avoiding the necessity of indivually adjusting each of the tractors when it is desired to feed a sheet or form of different width or to move a sheet into a different registration relative to the print station. This includes a system of belts or bands 45 and 46, preferably of steel or the like, of which there is one clamped to each of the tractor devices. The ends of the bands are wrapped around and secured to manually rotatably drum means carried by shaft means mounted on the outer side of the right-hand machine frame plate 12. As can be seen in FIGURE 1, angle bracket 51, secured to the frame plate 12, supports a substantially upright shaft 55 which is suitably journalled in said bracket and carries near its upper end a drum 56. Carried by the shaft 55 is an independently rotatable hollow shaft or sleeve 60 to the upper end of which is fixed adjacent drum 56, a drum 61. Each of the drums 56 and 61 is formed with a pair of circumferential grooves upon which are wound, in opposite directions, the opposite ends of a related one of the bands 45 and 56. The band 45 is associated with the drum 56, one end of the band being wound about the lower groove in the drum, the band running off the front end of the drum and reaching through an opening in the side frame 12 to a pulley 65 suitably mounted on the inner side of the left frame plate 11, the belt returning to the rear side of the drum 56 and wrapped around the upper groove of the drum. The belt 46 is associated with the drum 61 on the hollow shaft or sleeve 60, the belt similarly running from the front side of the upper groove of the drum, reaching around a pulley 66 and returning to the rear side of the lower groove of the drum.

From the foregoing it will be apparent that rotation of the shaft 55 and drum 56 fastened thereto will wind up one end of the band 45, at the same time unwinding the other end of the band to shift the left-hand tractor 25 along its supporting shaft in one direction or another, depending upon the direction of rotation of the drums, thereby to place the left-hand tractor at a selected position. Similarly, rotation of the sleeve 60 along with the drum 61 fastened thereto, will operate through the band 46 to shift the right-hand tractor 26 along its supporting shaft.

Rotation of the shaft 55 is accomplished through a beveled gear 80 fastened to the upper end of the shaft and disposed in meshing engagement with a beveled pinion 81 mounted on the end of a shaft 82 rotatably supported in brackets 83 secured to the side frame plate 12 of the machine. The front end of shaft 82 carries a manually rotatably knob 84 disposed at a conveniently accessible position for manipulation by the operator of the machine.

Rotation of the sleeve 60 for adjustment of the right-hand tractor 26, is effected in a similar manner by means of a beveled gear 90 mounted integrally with the drum 61 on the upper end of the sleeve, the beveled gear being disposed in meshing engagement with a beveled pinion pinion 91 mounted on the end of a shaft 92. The shaft 92 is carried in bracket 93 fastened to the side frame plate 12 of the machine and carries at its forward end a manually rotatably knob (not shown here, but see FIGURE 2) similar to knob 84, for manipulation by the operator to adjust the right-hand tractor 26.

The control knobs 84 are operated individually whenever it may be desired to alter the spacing between the left-hand tractor 25 and the right-hand tractor 26 so as to adjust the mechanism for handling sheets or forms of different widths.

Figure 2:
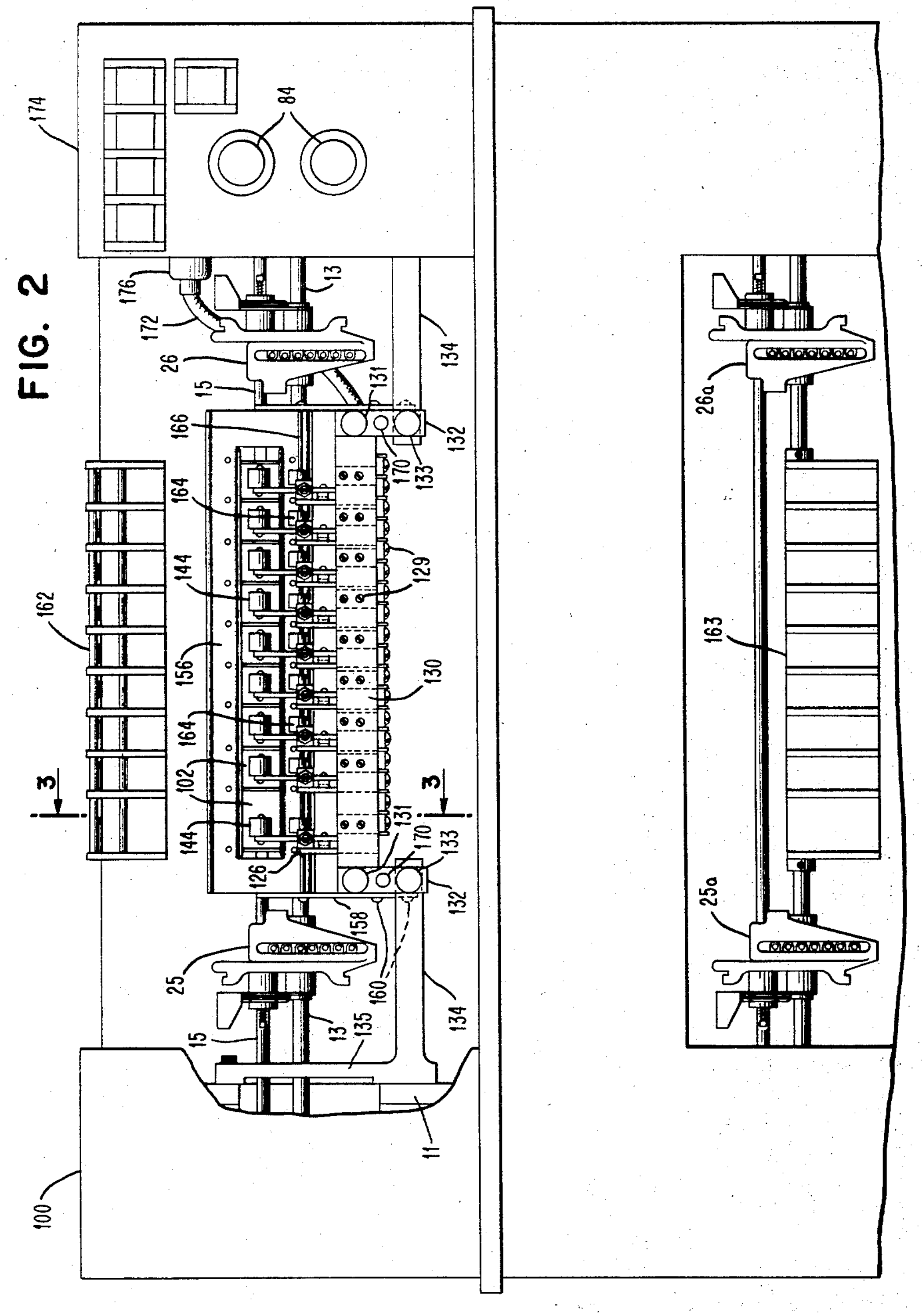
FIGURE 2 is a view similar to FIGURE 1 but showing the present invention attached thereto.

Patent 3,154,235, of course, includes other features, such as a second set of tractor elements **25*a* and 26*a* in a lower position, see FIGURE 2, and driven by extensions of shafts 55 and 60**.

From the above description, it will be understood that a single web of paper may be driven by the tractors 25 and 26 in a line by line or a skip line sequence depending upon the programming of the drive means for shaft 15. While other systems may be used, it is contemplated to drive shaft 15 in accordance with the method and apparatus disclosed in patent 3,154,233 and represented in the present discolsure by the box 100.

When it is necessary to print separate lists of information, the knobs 84 are used to move the tractors 25 and 26 to their completely retracted positions adjacent the frame members 11 and 12, as seen in FIGURE 2. This exposes and frees the square drive shaft 15 above the printing area defined by the hammer assembly 31, for attachment to the shaft of the list driving spools 102 of the present invention. The spools may all be of the same length or they may be of different lengths determined by the widths of the strips to be accommodated. In this figure nine spools are mounted on the shaft. Except for the larger spool on the left end and the smaller one on the right end, they are of the same size.

As shown more clearly in FIGURES 5 and 6, each spool comprises a cylindrical center portion 104 having end flanges 106 and a square axial bore 108 with substantially the same cross-sectional dimensions as shaft 15. If desired, and to conserve space, one end flange 106 may be omitted on spools where they abut other spool flanges.

To facilitate their mounting on the shaft 15 without disassembling this portion of the printer, each spool comprises two halves 110 and 112. The left half 110 has bores 114 formed in its face 116 for receiving pins 118 extending from face 120 of the right half 112. Preferably the bores and pins are formed in well known manner to provide a snap fit eliminating the need for screws or other devices for holding them together. The two halves are snapped together from opposite sides of shaft 15, as shown in FIGURE 6.

As seen in FIGURE 7, by way of example, the attachment of the spools to the shaft 15 may be effected in other ways. In this form, the mating faces 116 and 120 of the two halves are formed with dove-tail joints 122 for sliding engagement. The two halves are brought together from offset positions on opposite sides of shaft 15 and fixed in position by a set screw 124.

Preferably, the spools are formed of light weight material, such as aluminum. The center portions 104 are coated with a material having a high coefficient of friction, such as rubber, to effect good driving engagement with the lists, and they have a diameter which is the same as the pitch diameters of tractor teeth 38.

If desired, the driving weight of the tractors may be removed from shaft 15. As illustrated in FIGURE 4, the opposite ends of the shaft, as seen at 125, are machined to cylindrical shape with a diameter preferably the same as the transverse dimension of the shaft and with the square corner tapering into the cylinder, as at **15*a*. With the tractors in their retracted positions over the cylindrical portion their driving engagement with the shaft is disengaged and they remain idle when the shaft is rotated. Driving reengagement of the tractors with the shaft is effected by moving them toward the center with the square portion of the shaft aligned with the square bore of the tractor hubs, the tapered portion 15*a*** facilitating this reengagement.

Figure 3:
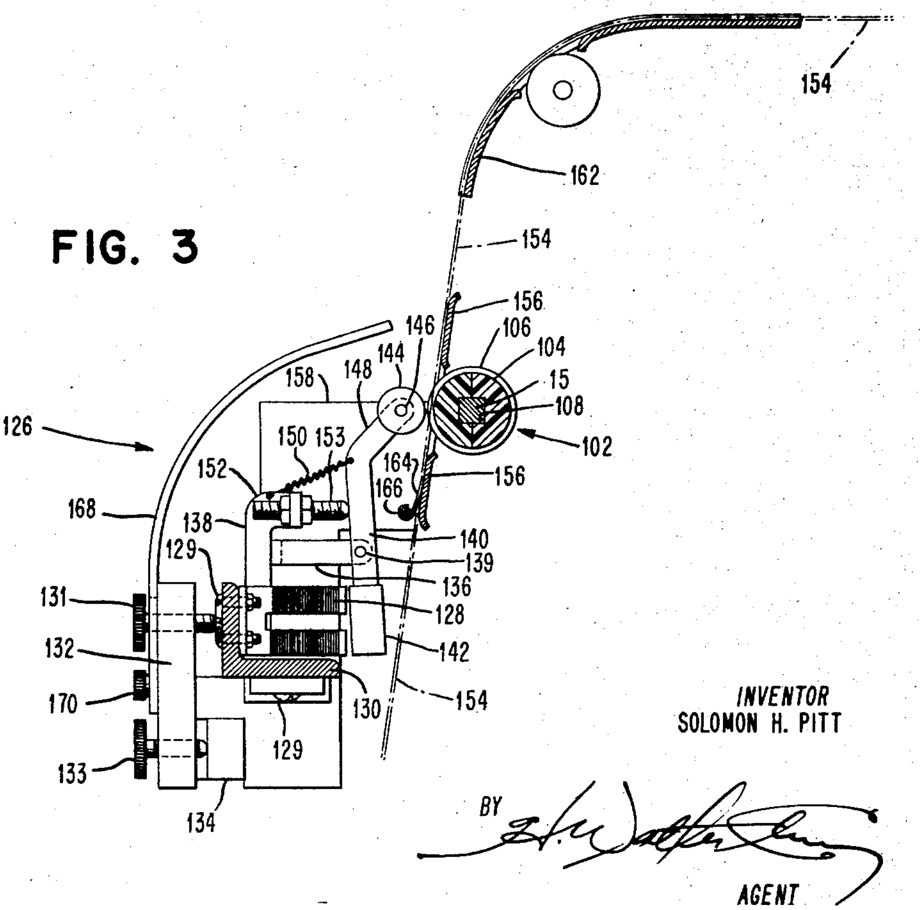
FIGURE 3 is a sectional view along line 3—3 of FIGURE 2.

With reference now to FIGURES 2 and 3, it is seen that each spool 102 is paired with a pinch roller assembly 126. Each of these has an electromagnet 128 secured, as by screws 129, on an angle bar 130 having its opposite ends adjustably secured, as by thumb screws 131, to brackets 132 removably secured by thumb screws 133 to arm 134 of L-shaped brackets 135 attached to and extending inwardly from the frame members 11 and 12.

An arm 136 is spaced above the electromagnet 128 and secured thereto by a downturned end 138. Pivotally mounted at 139 on the outer end of arm 136 is a rocker arm 140 having its lower end 142 positioned adjacent the magnet 128, and a pinch roller 144 journalled on a stub shaft 146 on its upper end 148. A spring 150 having one end connected to the upper end of rocker arm 140 and its other end to an upwardly and forwardly projecting portion 152 of arm 136, biases the rocker arm to a normally retracted position in which the pinch roller 144 is out of contact with spool 102 against an adjustment screw 153. This condition permits spool 102 to rotate without moving the list strip 154 threaded therebetween and over strip guides 156 traversing the printing area above and below the spools. The guides 156 are formed with end flanges 158 providing the means for securing them in position on brackets 132, as by screws 160. Additional strip guide means is shown at 162 and 163 for directing the strips to take up spools or baskets not shown. Anti back-up springs 164 carried by a rod 166 extending between flanges 158 and with their ends attached thereto, are biased against the lower guide 156 to prevent the strips from backing up when the pinch rollers are retracted. If desired, a trim or cover plate 168 may be attached over the assembly by thumb screws 170 turned into brackets 132.

The electromagnets may be actuated selectively by the computer or other business machines to which it is connected, through the cable 172 (FIGURE 2) connecting them to the control panel 174, thus to urge the associated list strips into driving engagement with the spools. Simple, well-known relay circuits, in which the relays are closed in response to a programmed pulse from the computer, are quite adequate for this purpose. In response to such signals any one or plurality of the pinch rollers may be actuated to press its associated list into driving engagement with the spools to be moved one or more printing lines as driven by the apparatus in the box 100 (Patent 3,154,233).

The equipment is easily returned to its original condition simply be removing the spools 102. Cable 172 may be disconnected, if desired, by pulling its plug connector 176. The pinch roller assembly may be removed, or retracted to a position where it does not interfere with normal operation of the printer. Tractors 25 and 26 are then returned to the printing area by turning knobs 84.

While it has been indicated above that instructions for the operation of the list advance mechanism may be programmed from a computer or other apparatus with which the printer is associated, in order to avoid any changes in the interface of the computer-printer assembly during use of the printer as a lister, such instruction may be automatically controlled by the printer itself, as described below.

The circuit shown in FIGURE 8 may be incorporated in the printer to render it self-sufficient as to the selective advance of the various lists during printing. In a typical operation, a machine program inserts information in the image or printing area described above. Upon receipt of a print order the information is printed on the pertinent lists. At this point it might be helpful to assume a specific check sorting and listing example.

Normally a printer would have 132 character positions. Let it be assumed that the lists are arranged so that list No. 1 covers columns—character positions—1–20, and that lists Nos. 2–9 cover respectively columns 23–34, 37–48, 51–62, 65–76, 79–90, 93–104, 107–118, and 121–132. This provides twenty columns for list No. 1—which will be the "Master List"—and twelve columns each for the working lists, 2 through 9, with two columns between each list where the spool flanges 106 are located. Each working list is assigned to a different bank corresponding to a specific pocket in the check reader and sorter with which the printer is associated in this example. List No. 1 will contain the bank number and the amount of all checks, while only the checks of a specific bank will be listed on each of the working lists.

If the sorter reads a check in the amount of $120.30 drawn on bank No. 5, both the amount and bank number are printed on the Master List (the #5 in column 8 and 120.30 in columns 14–19) while only the amount is printed on list No. 5 (columns 70–75). The check is sorted in pocket No. 5 corresponding to the bank number.

Only the Master List and list #5 should now be advanced one line, as they were the only lists printed on. Note that in this example a decimal point will always be printed in the third least significant digit position of each list, at columns 17 and 73 in lists Nos. 1 and 5.

Now turning to FIGURE 8, it is seen that the pulse input lines 180 and 182 from the sorter to the print hammer actuators 184 and 186 respectively at columns 17 and 73 are connected to flip-flop drivers 188 and 190 by wires 192 and 194. The pulses which actuated the print hammers at columns 17 and 73 also set the flip-flops 188 and 190 to turn on the pinch roller actuators (electromagnets 128) serving the lists at these two positions whereby their associated lists are urged into contact with their drive spools. All other pinch rollers are in their retracted positions. The next programmed "feed" instruction now will advance only the two lists which were printed upon. The flip-flops are reset by the brake signal to the normal feed clutch. This signal is also forwarded to the flip-flops over wires **192*a***.

While only the control columns 17 and 73 have been discussed, it will be understood that similar circuitry will be utilized for the other lists. Actually, with the use of quick disconnect terminal connections, any column in a particular printing group—see above—can be used to sense the lists being printed upon.

Thus, the printer itself is effective to determine the lists printed upon i.e. the printer provides a memory device—the flip-flops—to store information as to what lists have been printed. Since the mode of operation is to advance and thus print, the lists which have been printed must be moved to allow the next print operation. Accordingly, with the information (as to which lists have been printed) stored, the printer acts to move only those lists and ready the printer for the next print operation. Thus the expense of making extensive changes in the programming of the associated apparatus is eleminated.

The embodiments of the invention in which an exclusive property or privilege is claimed are defined as follows:

1. A paper feeding device for use with a high speed printer comprising in combination:

(a) shaft means adapted to be driven in axial rotation by said printer, said shaft means formed to be rectangular in shape in the middle section thereof and further formed to have a smaller cross-section and the end sections thereof;

(b) at least first and second tractor means capable of moving wide sheet paper and each having an aperture therein formed to permit said tractor means to snugly fit over said middle section of said shaft so that when mounted thereon said rotational movement of said shaft will cause said tractor means to advance paper held thereby and said aperture formed so that when said tractors are mounted on the end sections of said shaft said rotational movement occurs within said aperture and said shaft does not operationally engage said tractors;

(c) a plurality of tractor spools, each having an axial bore of substantially the same size and shape as said middle section of said shaft, said spools each being longitudinally split into at least two parts whereby it may be mounted upon said middle section of said shaft by joining said parts together to form said axial bore around said middle section of said shaft;

(d) each spool having means for securing said spool parts together to form a whole spool;

(e) a plurality of pinch rollers with each one assigned to a different location along said middle section of said shaft whereupon one of said spools is mounted;

(f) a plurality of positioning means with each coupled to a different one of said pinch rollers and each formed to be able to move its respective pinch roller against or away from the latter's assigned spool in response to an electrical signal; and (g) logic circuitry means coupled to said plurality of positioning means to selectively signal each of said positioning means in order to advance paper held between a selected pinch roller and its assigned spool.

References Cited

UNITED STATES PATENTS

| | | | |
|---|---|---|---|
| 1,531,875 | 3/1925 | Ray | 197—129 |
| 2,098,978 | 11/1937 | Sherman | 197—145 |
| 2,346,163 | 4/1944 | Hiles | 197—133 |
| 2,862,596 | 12/1958 | Metzner | 197—133 |
| 3,006,061 | 10/1961 | Zahradnik | 197—144 X |
| 3,114,491 | 12/1963 | Wright | 197—133 X |
| 3,154,235 | 10/1964 | Hubbard | 197—133 X |
| 3,176,819 | 4/1965 | Bloom et al. | 197—133 |
| 3,219,043 | 12/1966 | Bernard | 197—151 X |

FOREIGN PATENTS

| | | |
|---|---|---|
| 726,476 | 10/1942 | Germany. |
| 567,455 | 2/1945 | Great Britain. |

ROBERT E. PULFREY, *Primary Examiner.*

ERNEST T. WRIGHT, JR., *Assistant Examiner.*

U.S. Cl. X.R.

197—138